2,982,740
PROCESS FOR PRODUCING PHOSPHORS

Paul Goldberg, Long Beach, and Allen L. Solomon, Glen Cove, N.Y., assignors, by mesne assignments, to Sylvania Electric Products, Inc., Wilmington, Del., a corporation of Delaware No Drawing. Filed Dec. 30, 1957, Ser. No. 705,750

12 Claims. (Cl. 252—301.6)

Our invention relates to electroluminescent phosphors and processes for making the same.

Electroluminescent phosphors are phosphors which emit light in the presence of an electric field. One type of phosphor, known as the zinc sulphide type of electroluminescent phosphor, includes together with suitable activators and coactivators, those phosphors wherein up to 20 mole percent of cadmium can be substituted for an equivalent mole percent of zinc and wherein up to 30% mole percent of selenium can be substituted for an equivalent mole percent of sulphur. Conventionally, such phosphors are dispersed in dielectric media and the dispersion is placed between two electrically conductive electrodes, at least one of which permits the passage of light therethrough to produce an electroluminescent lamp. A voltage is applied between the two electrodes and light is emitted from the dispersion.

We have succeeded in developing a new process for producing electroluminescent phosphors of the zinc sulphide type which results in a phosphor with significantly enhanced electroluminescence.

Accordingly, it is an object of the present invention to provide a new and improved process for making electroluminescent phosphors of the zinc sulphide type.

Another object is to increase the brightness of an electroluminescent phosphor of the zinc sulphide type.

Still another object is to improve the processing of electroluminescent phosphors of the zinc sulphide type in such manner as to sharply increase the brightness of the resultant phosphor.

These and other objects of our invention will either be explained or will become apparent hereinafter.

In accordance with the principles of our invention a copper activator and at least one halide coactivator selected from the class consisting of chloride, iodide and bromide, are added to a base material of the zinc sulfide type wherein up to 20 mole percent of cadmium can be substituted for an equivalent mole percent of zinc and wherein up to 30 mole percent of selenium can be substituted for an equivalent mole percent of sulfur. The resultant mixture is then fired to a temperature falling within the approximate range 1000–1300° C. to produce an intermediate phosphor product having a copper activator concentration falling within the approximate range $1 \times 10^{-4}$ to $5 \times 10^{-3}$ gram atoms per mole of base material, and a halide coactivator concentration also falling within the approximate range $1 \times 10^{-4}$ to $5 \times 10^{-3}$ gram atoms per mole of base material.

The intermediate product is then mixed with at least $1 \times 10^{-5}$ gram atoms per mole of copper and refired in air or in an inert atmosphere at a lower temperature falling within the approximate range 750° C.–950° C. to produce, after suitable washing, the final phosphor product. This final product, when tested in an electroluminescent lamp, has significantly increased electroluminescence, its light output being increased by a factor of two or more as compared to the light output of all other phosphors known to us when tested under the same conditions.

In our process, the activator-coactivator mole ratio of the intermediate product resulting from the first firing step is determined prior to the second firing step. If this mole ratio for the intermediate product is substantially less than 1, an appropriate amount of copper must be added to readjust the mole ratio to approximately one in the second firing step. When this mole ratio is substantially equal to or larger than 1, at least the minimum amount of copper previously stated, i.e. $1.0 \times 10^{-5}$ gram atoms per mole, must be added in the second firing step. If copper is added in an amount larger than this minimum, it is preferable to remove the excess copper from the phosphor produced as a result of the second firing step, as for example by washing the phosphor with an aqueous solution containing about 0.1% by weight of cyanide. (If this excess copper is not removed, there can be substantial reduction of emitted light due to light absorption in the phosphor itself.) If copper is not added in both firing steps, we have found that the desired enhancement of electroluminescence will not ensue.

Illustrative embodiments of our invention will now be described in more detail with reference to the examples which follow.

*Example I*

Zinc sulfide and cadmium sulfide powders were thoroughly mixed together, the mixture containing 95% by weight of zinc sulphide and 5% by weight of cadmium sulfide and weighing 15 grams. Copper sulfate was thoroughly blended with this mixture in an amount sufficient to establish a copper concentration of $2 \times 10^{-4}$ gram atoms per mole of the sulfide mixture. A chloride flux was blended with the mixture in an amount equal to about 8% by weight of the sulfide mixture, this flux consisting of 3% barium chloride, 3% magnesium chloride and 2% sodium chloride, each percentage being by weight of the sulfide mixture. The resulting blend was fired in a covered crucible in air to a temperature of 1150° C. for six hours.

The intermediate product resulting from this firing was irradiated with ultraviolet and found to exhibit green phosphorescence. When chemically analyzed, this product was found to have an activator-coactivator mole ratio of .8 with no loss of the added copper.

Copper sulfate was added to the intermediate product in an amount sufficient to increase the total copper concentration by $1 \times 10^{-4}$ gram atoms per mole of zinc sulfide. The copper-augmented mixture was then fired in a covered crucible in air to a temperature of 800° C. for about one hour. The furnace was shut off, and the crucible was permitted to cool for several hours in the furnace before removal. The mixture was then removed from the crucible and washed with dilute acetic acid to produce the final product, an electroluminescent phosphor having an activator-coactivator mole ratio of 1.2. This phosphor, when tested in an electroluminescent lamp, was found to have enhanced electroluminescence as compared to known electroluminescent phosphor having similar color characteristics, when all phosphors were tested under the same conditions in electroluminescent lamps. More specifically, the light output of our phosphor when dispersed in castor oil and placed in a lamp 1 inch wide by 1 inch long by 0,005 inch thick and actuated by an alternating voltage of 60–600 volts (the frequency being 60–6000 cycles per second) was about two times larger than the light output from the best of these known phosphors when measured by the same photometer under the same conditions.

Our phosphor was found to have a much lighter body color than the aforementioned prior art phosphors and exhibited a higher degree of crystallinity. X-ray powder diffraction patterns showed the material to have a hexagonal crystalline structure.

*Example II*

The process of Example I was repeated using the same amounts of activator and coactivator, the base material again weighing 15 grams and containing 85.5% by weight of zinc sulfide and 14.5% by weight of cadmium sulfide.

The results were essentially the same as in Example I, except that this phosphor exhibited blue-green electroluminescence.

*Example III*

Copper sulfate was thoroughly blended with zinc sulfide in an amount sufficient to establish a copper concentration of $9 \times 10^{-4}$ gram atoms per mole of the zinc sulfide. In addition, the chloride flux of Example I was also thoroughly blended with the mixture, in an amount equal to about 8% of the sulfide mixture. The resulting blend was fired in a covered crucible in air to a temperature of 1200° C. for three hours.

The intermediate product resulting from this firing was irradiated with ultraviolet and found to exhibit green fluorescence. When chemically analyzed, this product was found to have an activator-coactivator mole ratio of 1.1 with no loss of the added copper.

Copper sulfate was added to the intermediate product in an amount sufficient to increase the total copper concentration by $6 \times 10^{-4}$ gram atoms per mole of zinc sulfide. The copper-augmented mixture was then fired in a covered crucible in air to a temperature of about 775° C. for about one hour. After the crucible was permitted to cool in the furnace in the manner previously indicated, the mixture was then removed from the crucible and washed first with dilute acetic acid, then washed thoroughly with water, then washed with an aqueous potassium cyanide solution (0.1% concentration by weight) and finally again washed with water to produce the final product, an electroluminescent phosphor having an activator-coactivator mole ratio of 1.0. This phosphor, when tested in an electroluminescent lamp, was found to have enhanced electroluminescence colored green at low excitation frequencies (up to about 1.5 kilocycles/sec.), the color gradually changing toward blue at higher frequencies.

*Example IV*

Zinc sulfide, selenium and zinc oxide powders were mixed together, the mixture containing 66.1% by weight of zinc sulfide, 20.1% of selenium, and 13.8% of zinc oxide. Copper sulfate was blended with this mixture in an amount sufficient to establish a copper concentration of about $3.2 \times 10^{-4}$ gram atoms per mole of the mixture. In addition, potassium iodide was also blended with the mixture in an amount equal to about 17% by weight of the mixture. The resulting blend was fired in a covered crucible in helium (or other inert atmosphere) to a temperature of 1165° C. for about one hour.

After washing with acetic acid, the intermediate product was found to contain 30 mole percent of zinc selenide and 70 mole percent of zinc sulfide.

Copper sulfate was added to the intermediate product in an amount sufficient to increase the total copper concentration by $7 \times 10^{-5}$ gram atoms per mole of the mixture. The copper-augmented mixture was then fired in helium to a temperature of 800° C. for about 40 minutes. The mixture was then removed from the crucible and washed first with an aqueous solution of potassium cyanide (0.1% concentration by weight) and then washed with water to produce the final product, an electroluminescent phosphor. This phosphor, when tested in an electroluminescent lamp, was found to have enhanced yellow-green electroluminescence at excitation frequencies of about 1000 cycles per second and lower, the color gradually changing to green as the excitation frequencies were increased.

*Example V*

The process of Example IV was repeated with the copper addition in the first firing step being about $7 \times 10^{-4}$, and with about 13% by weight of potassium bromide being substituted for the 17% by weight of potassium iodide. Further, the copper addition in the second firing step increased the total copper concentration by $1 \times 10^{-4}$ gram atoms per mole in place of the $7 \times 10^{-5}$ gram atoms per mole addition of Example IV.

The results were substantially the same as in Example IV, except that the phosphor produced exhibited greenish-yellow electroluminescence.

Additional tests indicated that any mole percent (up to 30 mole percent) of selenium can be substituted for an equivalent mole percent of sulfur, and any mole percent up to 20 mole percent of cadmium can be substituted for an equivalent mole percent of zinc.

Further tests on our process showed that the firing temperatures used on the first step could be varied within the approximate range 1000° C.–1300° C. with an optimum of about 1150° C.–1200° C.; that the firing temperatures in the second firing step could be varied within the approximate range 700° C.–950° C. with an optimum range of about 800° C.–850° C.; that the absolute concentrations of the copper and the halide in the intermediate product could be varied within the approximate range $1 \times 10^{-4}$ to $5 + 10^{-3}$ gram atoms per mole of the base material.

While we have shown and pointed out our invention as applied above, it will be apparent to those skilled in the art that many modifications can be made within the scope and sphere of our invention as defined in the claims which follow.

What is claimed is:

1. A process for producing an electroluminescent phosphor from a base material of the zinc sulfide type wherein up to 20 mole percent of cadmium can be substituted for an equivalent mole percent of zinc and wherein up to 30 mole percent of selenium can be substituted for an equivalent mole percent of sulfur, said process comprising the steps of mixing said material with a copper activator and at least one halide coactivator selected from the group consisting of chloride, iodide and bromide; firing said mixture in a non-reducing atmosphere to a temperature falling within the approximate range 1000° C.–1300° C. to produce an intermediate product having absolute activator and coactivator concentrations falling within the same approximate range of $1 \times 10^{-4}$ to $5 \times 10^{-3}$ gram atoms per mols of said material; mixing at least $1 \times 10^{-5}$ additional gram atoms per mole of said activator with said intermediate product; and firing said copper-augmented intermediate product in a non-reducing atmosphere to a temperature falling within the approximate range 700° C.–950° C. to produce said electroluminescent phosphor.

2. The process for manufacture of an electroluminescent zinc sulfide type phosphor having a predominantly hexagonal crystal structure, which process comprises the steps of thoroughly mixing precipitated zinc sulfide and cadmium sulfide in proportions to give from 0 to 20 mole percent cadmium sulfide in the mixture with copper sulfate in an amount such that $1 \times 10^{-4}$ up to $5 \times 10^{-3}$ gram atoms of copper are present for each mole of the mixture of zinc and cadmium sulfide and from 3–15% of at least one fluxing material selected from the group consisting of bromides, chlorides and iodides of sodium, barium, potassium and magnesium, firing said mixture in covered crucibles in air at a temperature between about 1000° C. and 1300° C.; cooling the fired mixture rapidly by removing the crucible from the furnace; washing the cake with water; adding between $1 \times 10^{-5}$ to $5 \times 10^{-3}$ gram atoms of copper per mole of zinc sulfide to said cake;

refiring said cake in a covered crucible in air at a temperature between about 700° C. and 950° C.; washing the resultant cake first with a dilute aqueous solution of acetic acid, then with water, then with a dilute solution of an alkali cyanide, and finally again washing with water to remove excess cyanide along with dissolved copper; and drying the resultant phosphor.

3. A process for producing an electroluminescent phosphor from a base material of the zinc sulfide type wherein up to 20 mole percent of cadmium can be substituted for an equivalent mole percent of zinc and wherein up to 30 mole percent of selenium can be substituted for an equivalent mole percent of sulfur, said process comprising the steps of mixing said material with a copper activator and at least one halide coactivator selected from the group consisting of chloride, iodide and bromide; firing said mixture in a non-reducing atmosphere to a temperature falling within the approximate range 1000° C.–1300° C. to produce an intermediate product having absolute activator and coactivator concentrations respectively falling within the same approximate range of $1\times10^{-4}$ to $5\times10^{-3}$ gram atoms per mole of said base material, the activator-coactivator mole ratio being in excess of 1.0; mixing at least $1\times10^{-5}$ additional gram atoms per mole of said activator with said intermediate product; firing said copper-augmented intermediate product in a non-reducing atmosphere to a temperature falling within the approximate range 700° C.–950° C. to produce said electroluminescent phosphor; and chemically removing sufficient copper from said phosphor to readjust said ratio to about 1.

4. A process for producing an electroluminescent phosphor from a base material of the zinc sulfide type wherein up to 20 mole percent of cadmium can be substituted for an equivalent mole percent of zinc and wherein up to 30 mole percent of selenium can be substituted for an equivalent mole percent of sulfur, said process comprising the steps of mixing said material with a copper activator and at least one halide coactivator selected from the group consisting of chloride, iodide and bromide; firing said mixture in a non-reducing atmosphere to a temperature falling within the approximate range 1000° C.–1300° C. to produce an intermediate product having absolute activator and coactivator concentrations respectively falling within the same approximate range of $1\times10^{-4}$ to $5\times10^{-3}$ gram atoms per mole of said base material, the activator-coactivator mole ratio falling below 1.0; mixing at least $1\times10^{-5}$ additional gram atoms per mole of said activator with said intermediate product to adjust said ratio to about 1.0; and firing said copper-augmented intermediate product in a non-reducing atmosphere to a temperature falling within the approximate range 700° C.–950° C. to produce said electroluminescent phosphor.

5. A process for producing an electroluminescent phosphor from a base material of the zinc sulfide type wherein up to 20 mole percent of cadmium can be substituted for an equivalent mole percent of zinc and wherein up to 30 mole percent of selenium can be substituted for an equivalent mole percent of sulfur, said process comprising the steps of mixing said material with a copper activator and at least one halide coactivator selected from the group consisting of chloride, iodide and bromide; firing said mixture in a non-reducing atmosphere to a temperature falling within the approximate range 1000° C.–1300° C. to produce an intermediate product having absolute activator and coactivator concentrations respectively falling within the same approximate range of $1\times10^{-4}$ to $5\times10^{-3}$ gram atoms per mole of said base material, the activator-coactivator mole ratio being in excess of 1.0; mixing at least $1\times10^{-5}$ additional gram atoms per mole of said activator with said intermediate product; firing said copper-augmented intermediate product in a non-reducing atmosphere to a temperature falling within the approximate range 700° C.–950° C. to produce said electroluminescent phosphor; and washing said phosphor in a cyanide solution to remove sufficient copper from said phosphor to readjust said ratio to about 1.0.

6. A process for producing an electroluminescent phosphor from at least one base material selected from the class consisting of the sulfides of zinc and cadmium-zinc wherein up to 20 mole percent of cadmium can be substituted for an equivalent mole percent of zinc, said process comprising the steps of mixing a copper activator and at least one halide coactivator selected from the group consisting of chloride, iodide and bromide; firing said mixture in air to a temperature falling within the approximate range 1000° C.–1300° C. to produce an intermediate product having absolute activator and coactivator concentrations respectively falling within the same approximate range of $1\times10^{-4}$ to $5\times10^{-3}$ gram atoms per mole of said base material; mixing at least $1\times10^{-5}$ additional gram atoms per mole of said activator with said intermediate product; and firing said copper-augmented intermediate product in air to a temperature falling within the approximate range 700° C.–950° C. to produce said electroluminescent phosphor.

7. A process for producing an electroluminescent phosphor from at least one base material selected from the group consisting of the sulfo-selenides of zinc and zinc-cadmium wherein up to 20 mole percent of cadmium can be substituted for an equivalent mole percent of zinc and wherein up to 30 mole percent of selenium can be substituted for an equivalent mole percent of sulfur, said process comprising the steps of mixing a copper activator and at least one halide coactivator selected from the group consisting of chloride, iodide and bromide; firing said mixture in an inert atmosphere to a temperature falling within the approximate range 1000° C.–1300° C. to produce an intermediate product having absolute activator and coactivator concentrations respectively falling within the same approximate range of $1\times10^{-4}$ to $5\times10^{-3}$ gram atoms per mole of said base material mixing at least $1\times10^{-5}$ additional gram atoms per mole of said activator with said intermediate product; and firing said copper-augmented intermediate product in an inert atmosphere to a temperature falling within the approximate range 700° C.–950° C. to produce said electroluminescent phosphor 8. A process for producing an electroluminescent phosphor from a base material mixture composed of about 95% by weight of zinc sulfide and about 5% by weight of cadmium sulfide, said process comprising the steps of adding a copper activator in an amount equal to about $2\times10^{-4}$ gram atoms per mole of mixture and adding about 8% by weight of mixture of a chloride coactivator composed of the chlorides of barium, magnesium and sodium; firing the resultant mixture in air to a temperature of about 1150° C.; mixing about $1\times10^{-4}$ additional gram atoms per mole of mixture of said activator with said intermediate product; firing said copper-augmented intermediate product in air to a temperature of about 800° C. to produce a blue electroluminescent phosphor.

9. A process for producing an electroluminescent phosphor from a base material mixture composed of about 85% by weight of zinc sulfide and about 15% by weight of cadmium sulfide, said process comprising the steps of adding a copper activator in an amount equal to about $2\times10^{-4}$ gram atoms per mole of mixture and adding about 8% by weight of mixture of a chloride coactivator composed of the chlorides of barium, magnesium and sodium; firing the resultant mixture in air to a temperature of about 1150° C.; mixing about $1\times10^{-4}$ additional gram atoms per mole of mixture of said activator with said intermediate product; firing said copper-augmented intermediate product in air to a temperature of about 800° C. to produce a blue-green electroluminescent phosphor.

10. A process for producing an electroluminescent phosphor from zinc sulfide base material, said process comprising the steps of adding a copper activator in an amount equal to about $9 \times 10^{-4}$ gram atoms per mole of said material and adding about 8% by weight of said material of a chloride coactivator composed of the chlorides of barium, magnesium and sodium; firing the resultant mixture in air to a temperature of about 1200° C.; mixing about $6 \times 10^{-4}$ additional gram atoms per mole of mixture of said activator with said intermediate product; firing said copper-augmented intermediate product in air to a temperature of about 775° C. to produce a green electroluminescent phosphor.

11. A process for producing an electroluminescent phosphor from a base material mixture composed of about 66% by weight of zinc sulfide, about 20% by weight of selenium and about 14% by weight of zinc oxide, said process comprising the steps of adding a copper activator to said mixture in an amount equal to about $3.2 \times 10^{-4}$ gram atoms per mole of said mixture and also adding potassium iodide in an amount equal to about 17% by weight of said mixture; firing the resultant mixture in an inert atmosphere to a temperature of about 1165° C.; adding sufficient copper activator to the intermediate product to increase the copper content by about $7 \times 10^{-5}$ gram atoms per mole of said product; and firing said copper-augmented intermediate product in an inert atmosphere to a temperature of about 800° C. to produce a yellow-green electroluminescent phosphor.

12. A process for producing an electroluminescent phosphor from a base material mixture composed of about 66% by weight of zinc sulfide, about 20% by weight of selenium and about 14% by weight of zinc oxide, said process comprising the steps of adding a copper activator to said mixture in an amount equal to about $7 \times 10^{-4}$ gram atoms per mole of said mixture and also adding potassium bromide in an amount equal to about 13% by weight of said mixture; firing the resultant mixture in an inert atmosphere to a temperature of about 1165 C.; adding sufficient copper activator to the intermediate product to increase the copper content by about $1 \times 10^{-4}$ gram atoms per mole of said product; and firing said copper-augmented intermediate product in an inert atmosphere to a temperature of about 800° C. to produce a greenish-yellow electroluminescent phosphor.

References Cited in the file of this patent

UNITED STATES PATENTS

| | | |
|---|---|---|
| 2,774,739 | Butler | Dec. 18, 1956 |
| 2,802,792 | Butler | Aug. 13, 1957 |
| 2,821,509 | Hunt | Jan. 28, 1958 |